Aug. 21, 1928.  1,681,542
R. E. KORTEPETER ET AL
REPEATER MOTOR INDICATOR
Filed Dec. 1, 1921   2 Sheets-Sheet 1
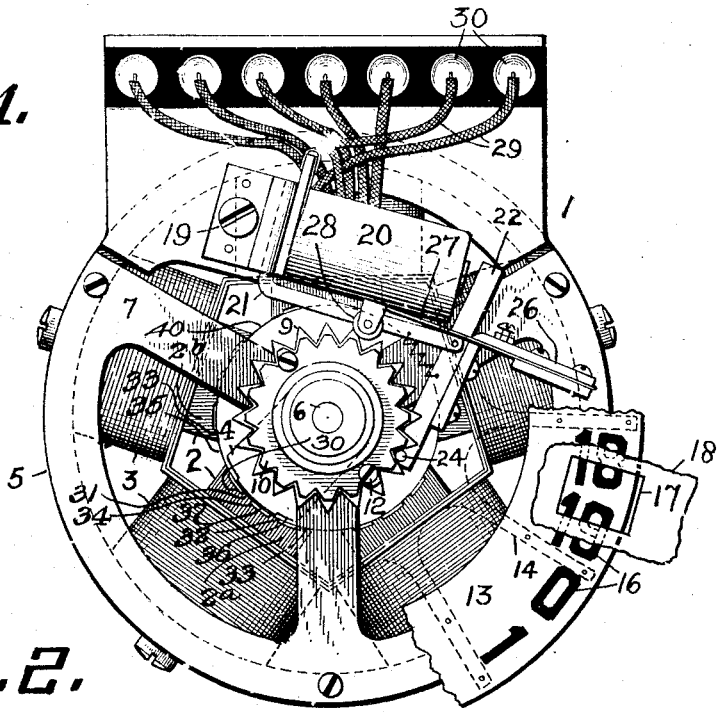
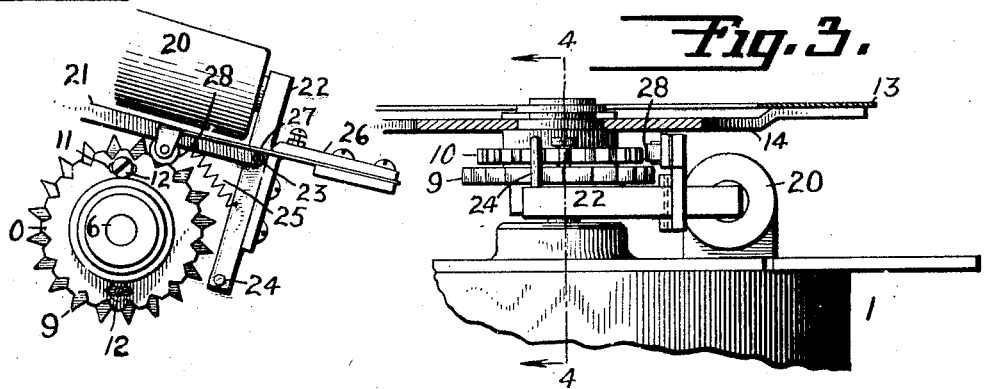

Aug. 21, 1928. 1,681,542
R. E. KORTEPETER ET AL
REPEATER MOTOR INDICATOR
Filed Dec. 1, 1921 2 Sheets-Sheet 2
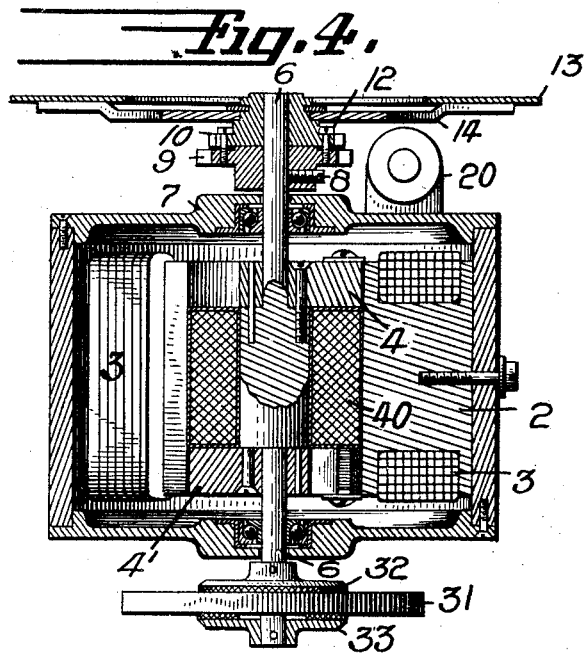
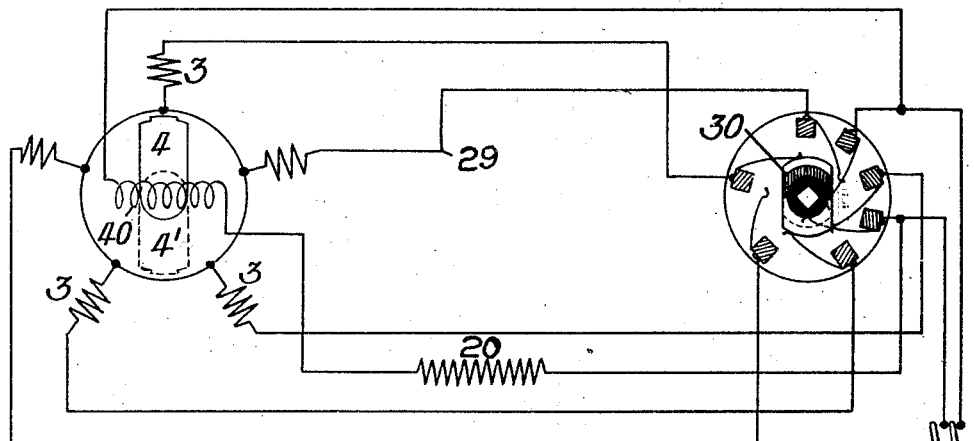
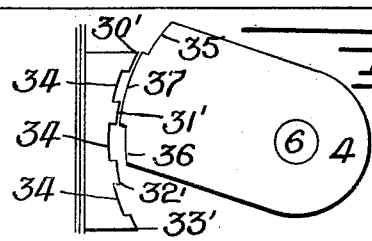
Inventor
RALPH E. KORTEPETER and
ADOLF AMUNSEN
By their Attorney
Herbert H. Thompson Patented Aug. 21, 1928.

1,681,542

UNITED STATES PATENT OFFICE.

RALPH E. KOETEPETER, OF BROOKLYN, AND ADOLF AMUNDSEN, OF GLENDALE, NEW YORK, ASSIGNORS TO THE SPERRY GYROSCOPE COMPANY, OF BROOKLYN, NEW YORK, A CORPORATION OF NEW YORK.

REPEATER-MOTOR INDICATOR.

Application filed December 1, 1921. Serial No. 519,058.

This invention relates to repeater motors adapted to position indicators or other devices in accordance with a remotely located transmission device. More specifically the invention relates to repeater motors, adapted through a limited number of field poles to position an armature in a much larger number of positions.

Motors of this type are used to position indicators which are usually mounted directly on the shaft of the motor armature. Where the field poles are energized in various combinations to step the armature into corresponding and definite positions, difficulties frequently arise due to very slight differences in the strength of the several field poles. This results in inaccurate adjustment of the indicator card; the references carried by the card being slightly out of proper position in one direction or the other.

One of the objects of the present invention is to overcome this objection by devising a motor which, when responding to impulses received from the transmitter, moves the index reference to a precise position on a dead center.

Another object is to devise an improved means for throwing the motor armature out of its step positions when the current is turned off, so that when the current is turned on again, if the transmitter should have been turned through an angle of 180°, the repeater will not be held out of synchronism.

Other objects will appear in the description which follows:

Referring to the drawings wherein we have shown what we now consider to be the preferred form of our invention:

Fig. 1 is a top view of a repeater motor embodying our invention.

Fig. 2 is a detail in a different working position of a portion of the mechanism shown in Fig. 1.

Fig. 3 is a side detail of the mechanism mounted on the top of the motor.

Fig. 4 is a sectional view taken on line 4—4 of Fig. 3.

Fig. 5 is a detail showing notches in the pole pieces and armature of the motor.

Fig. 6 is a wiring diagram of the motor and transmitter.

The repeater motor 1 is shown as comprising a plurality of field poles 2 with windings 3 therefor, and an armature 4, contained in a casing 5. The armature shaft 6 bearing in the end member 7 of the casing and projecting therethrough, may have fixed thereon by means of a set screw 8, a star wheel 9. A second star wheel 10 may be loosely mounted on the shaft and may be provided with one or more slots 11 therethrough, through which screws 12 may project; said screws being threaded into the star wheel 9. This will hold the wheel 10 in place and permit it to rotate slightly with respect to the shaft 6.

An index card 13 having a hub or web portion 14 may be fixedly secured at 15 to the star wheel 10, and may have suitably inscribed thereon index references 16 adapted to register with any suitable cooperating reference, such as a window 17 in a casing 18 adapted to contain the apparatus.

Mounted on the top of the motor and secured thereto at 19, we have shown an electromagnet 20. Associated with the electromagnet is a bracket 21 having pivotally attached thereto at 23 a lever 22. Said lever carries a detent 24 at one end thereof which is adapted to engage the star wheel 9 as in Fig. 1. A spring 25 may serve to hold the detent normally in engagement with the star wheel. The rear end of the lever 22 is adjacent the electromagnet 20, the lever thus constituting the armature of the magnet. Thus, when the magnet is energized the action of spring 25 is overcome and the detent 24 is disengaged from the star wheel.

On the lever 22 we have shown a bracket 26 carrying a resilient arm 27 which in turn carries a roller detent 28 adapted to engage the star wheel 10. The detent 28 is so positioned as to be disengaged from wheel 10 when detent 24 is in engagement with its wheel as in Fig. 1, and engaged therewith when detent 24 is disengaged.

The motor illustrated is a 20 step motor, the five poles being excited in the proper sequence by a transmitter or commutator 30, (see Fig. 6). The motor actuates an indicator card 13 having twenty index references 16. The star wheels 9 and 10 accordingly are provided with twenty notches to correspond to the number of steps of the motor.

In the case of the wheel 10, which, as we have seen is fixed with respect to the references, the detent 28 is so positioned that when it is lodged in one of the notches as in Fig. 2, one of the references 16 will register with the window 17. The detent 24 is so positioned however, that when it is lodged in one of the notches of the star wheel 9, as shown in Fig. 1, the armature 4 will occupy a position between its operating step positions and the references 16 will be out of register with window 17.

The points of the star wheel 9 are shown as sharp, while those of wheel 10 may be cut off as indicated. By this construction it will be seen that whatever position the wheel 9 may be in when the detent 24 is brought into engagement therewith by the action of spring 25, the detent will find its way to the bottom of one of the notches, while the detent 28 may ride easily over the points of the wheel 10 and settle into the notches only when the motor armature is close to one of its step positions.

The field coils 3, the armature coil 40 and the electromagnet 20 are connected by wires 29 to transmitter 30, (see also Fig. 6).

The operation of the device is as follows;

When the current is turned on, the armature 4 and the electromagnet 20 are designed to be constantly energized. The magnet 20 will thus hold the detent 24 out of and the detent 28 in engagement with their respective star wheels as in Fig. 2. Energization of the fields in their various combinations will cause movement of the armature to correspond. Movement of the armature will in turn move the card 13 to place the desired reference 16 into register with the window 17. By reason of slight errors inherent in this type of motor, however, and by reason of the lost motion between the armature and the card, it will be seen that the reference is apt to be slightly too high or too low with respect to the window. This error will be corrected by the detent 28 which rides over star wheel 10. When the armature stops moving and is held in position by the magnetic forces of the fields, the detent will settle into the notch through which it is riding and so adjust the card that the reference will register correctly with the window.

Should a different combination of field poles now be energized, the armature would be shifted accordingly and the detent 28 would again effect the fine adjustment of the reference.

It is, of course, understood that while the device is energized, any actuation of the transmitter to shift the position of the armature 4, causes energization of each step of the repeater motor in rapid succession, so that the armature will follow the transmitter step by step, but if when the device is deenergized the transmitter were adjusted to cause a shifting of the armature through 180°, and the current then turned on, the armature not having moved would be caught on dead center, so to speak and would be held there. With the use of the detent 24, however, this condition cannot take place, for whenever the motor is deenergized, detent 24 engages star wheel 9 and turns it slightly to lodge in the bottom of one of the notches. This as we have seen, throws the armature out of step position and it cannot lie 180° from any other step position. Thus should the transmitter be moved through 180°, the corresponding energization of the fields of the repeater will effect a greater force on the armature about its axis of rotation on one side than on the other and the armature will be caused to respond.

Heretofore, in indicators of this and similar nature, the reference numerals have frequently appeared out of position and mistakes in reading are common in such cases. Such mistakes cannot occur with our invention, however, and if the reference is not in proper position, it will be understood that the apparatus is not in operation.

A further function then of the detent 24 in throwing the index reference out of position as in Fig. 1, is to show that the apparatus is not in operation.

Detent or roller 28 also has a further important function than that stated above. In repeater motors of this character, vibration or "hunting" is found to occur, which interferes with accurate reading until it is damped out. Detent 28 quickly suppresses or damps any vibration of the card and also of the motor, if the pin 12 is at or near one end of slot 11. As an alternative or supplementary damping means, I may also employ a fly wheel 31 loosely mounted on shaft 6 of motor 1 between collars 32 and 33 pinned on the shaft. Said collars are preferably provided with cloth or friction surfaces resting against the fly wheel, the whole acting as a very effective damper.

In addition to the foregoing semi-mechanical means for obtaining clear cut definition of steps in the step by step rotation of the armature 4, I prefer to so shape the pole pieces and armature as to greatly assist in sharp definition. To this end, I find the construction of the pole face and armature face illustrated in the drawings preferable. As indicated above, the motor illustrated is a 20 step motor having two opposite extending armatures 4 and 4' on opposite ends of the shaft 6, the armatures being polarized by a fixed coil indicated by the circle 40, in Fig. 1, shown more clearly in Fig. 4 and in the wiring diagram of Fig. 6. Although the motor has 20 steps, it only possesses five poles 2, so that the armature occupies four different positions in advancing over the face of each pole. To localize the magnetic flux in each position, I prefer to shape the poles themselves with a plurality of teeth 30', 31', 32' and 33', which are separated by cut away portions 34. Said teeth really constitute auxiliary poles or points of maximum flux concentration for the different positions of the armature in passing across the face of the pole. The armature 4 on the other hand is preferably provided with cut away or reduced end portions 35 and 36, thus providing a central portion 37 of greater radius than the end portions. With proper proportions then, the armature will occupy the following four positions for each pole;

*First position.*—When approaching the pole marked 2ª in Fig. 1, the central portion 37 of the armature will lie with the upper edge thereof in line with the edge of the tooth 33 of the pole 2ᵇ, the lower edge thereof being substantially in line with the lower edge of the tooth 30 of the pole 2ª.

*Second position.*—The upper edge of the central portion 37 will lie in line with the upper edge of the tooth 30 of the pole 2ª, and the lower edge will lie substantially in line with the lower edge of tooth 31.

*Third position.*—The two edges of 37 will be in line with the upper edge of tooth 31 and the lower edge of tooth 32.

*Fourth position.*—The two edges of 37 will be in line with the upper edge of tooth 32 and the lower edge of tooth 33.

The total width of the armature 4 may be and preferably is somewhat less than the width of the pole pieces. The cut-away end portions of the armature aid materially in accurate definition, since while they assist in pulling over the armature from one pole to another, they prevent the hanging or sticking of the armature to the pole which it is leaving, by providing sufficient air gap at that point.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combinations and relations described, some of these may be altered and others omitted without interfering with the more general results outlined, and the invention extends to such use.

Having herein described our invention what we claim and desire to secure by Letters Patent is:

1. In a step by step repeater motor, a plurality of field poles, an armature associated therewith, a star wheel fixedly connected to said armature, a second star wheel connected with said armature, a detent normally engaging said first mentioned wheel to desynchronize the armature with respect to said field poles, means for disengaging said detent when the motor is energized, a second detent normally disengaged and means for causing said second detent to yieldingly engage said second wheel to synchronize the same with the step positions of said armature when the motor is energized.

2. In combination, a step-by-step repeater motor having an armature, a star wheel fixedly connected to the armature thereof, a second star wheel having a lost motion connection with said armature, a detent adapted to engage said first mentioned wheel to actuate the same through a fraction of a step to prevent stopping of said armature on a dead center, a detent adapted to engage said second mentioned wheel to render the steps thereof definite by movement thereof relative to said armature, resilient means for normally holding said first mentioned detent in operative position and for holding said second detent in inoperative position, and means brought into action when the motor is energized for reversing the positions of said detents.

3. In a step-by-step repeater motor having a plurality of field poles and an armature, a disk on the armature shaft having a lost motion connection therewith and having notches therein equal in number to the number of steps of the motor, a detent yieldingly engaging said disk and so positioned with respect thereto that said detent lodges in a notch of said disk in each step position of said armature and an indicator actuated from said disk.

4. In a step-by-step repeater motor having a plurality of field poles and an armature, a disk on the armature shaft having a lost motion connection therewith and having notches therein equal in number to the number of steps of the motor, a normally disengaging detent, means brought into operation when the motor is energized for causing said detent to yieldingly engage said disk, said detent being so positioned with respect to said disk that said detent lodges in a notch of said disk in each step position of said armature and an indicator secured to said disk.

5. In a step-by-step repeater motor having a plurality of field poles and an armature, a disk on the armature shaft having a lost motion connection therewith and having notches therein equal in number to the number of steps of the motor, a normally disengaging detent, and an electro-magnet connected to said detent and adapted to be energized when the motor is energized for causing said detent to yieldingly engage said disk for predetermining the steps thereof.

6. In combination, a step-by-step repeater motor, a disk mounted on said motor and having notches therein equal in number to the number of steps of the motor, an indicator card associated with said wheel and provided with a reference numeral, a cooperating reference adjacent said card, a detent adapted to engage said disk and so positioned with respect thereto that said detent lodges in a notch of said disk in each step position of said armature for causing said reference numeral to register with said cooperating reference, and means brought into action when the motor is energized for causing said detent to engage said disk.

7. In combination with a multi-step repeater motor, an indicator actuated by said motor and adapted to indicate with respect to a fixed reference and means operative when the motor is deenergized for throwing the motor out of step position and said indicator out of indicating position with respect to said fixed reference.

8. In combination, an index element, means having lost motion connection with said element for actuating the same, separate means for actuating said element within the limits of said lost motion connection and means whereby said last-named means is rendered effective when said first means is rendered ineffective.

9. In an indicating device, a step-by-step repeater motor having an armature, an indicating element carried by said armature and adapted to indicate with respect to a fixed reference, means for maintaining said element in indicating position, means for displacing said element from indicating position, and means for rendering said first two means effective and ineffective, including means whereby rendering either of said first two means ineffective renders the other of said means effective.

10. In an indicating device, a step-by-step repeater motor having an armature, an indicating element carried by said armature and adapted to indicate with respect to a fixed reference, means for maintaining said element in indicating position, means for displacing said element from indicating position, means for rendering said first two means effective and ineffective including means whereby rendering either of said first two means ineffective renders the other of said means effective, and means whereby said first means is rendered effective when said motor is rendered effective and said second means is rendered effective when said motor is rendered ineffective.

In testimony whereof we have affixed our signatures.

RALPH E. KORTEPETER.
ADOLF AMUNDSEN.